(Model.)

D. HINMAN.
BLIND SLAT HOLDER.

No. 324,693. Patented Aug. 18, 1885.

Witnesses
Chas. J. Williamson
Henry C. Hazard

Inventor
David Hinman, by
Prindle & Russell, his Attys

UNITED STATES PATENT OFFICE.

DAVID HINMAN, OF SOUTHINGTON, CONNECTICUT.

BLIND-SLAT HOLDER.

SPECIFICATION forming part of Letters Patent No. 324,693, dated August 18, 1885.

Application filed April 28, 1885. (Model.)

*To all whom it may concern:*

Be it known that I, DAVID HINMAN, of Southington, in the county of Hartford, and in the State of Connecticut, have invented certain new and useful Improvements in Slat-Holders for Window-Blinds; and I do hereby declare that the following is a full, clear, and exact description thereof, reference being had to the accompanying drawings, in which—

Figure 1:
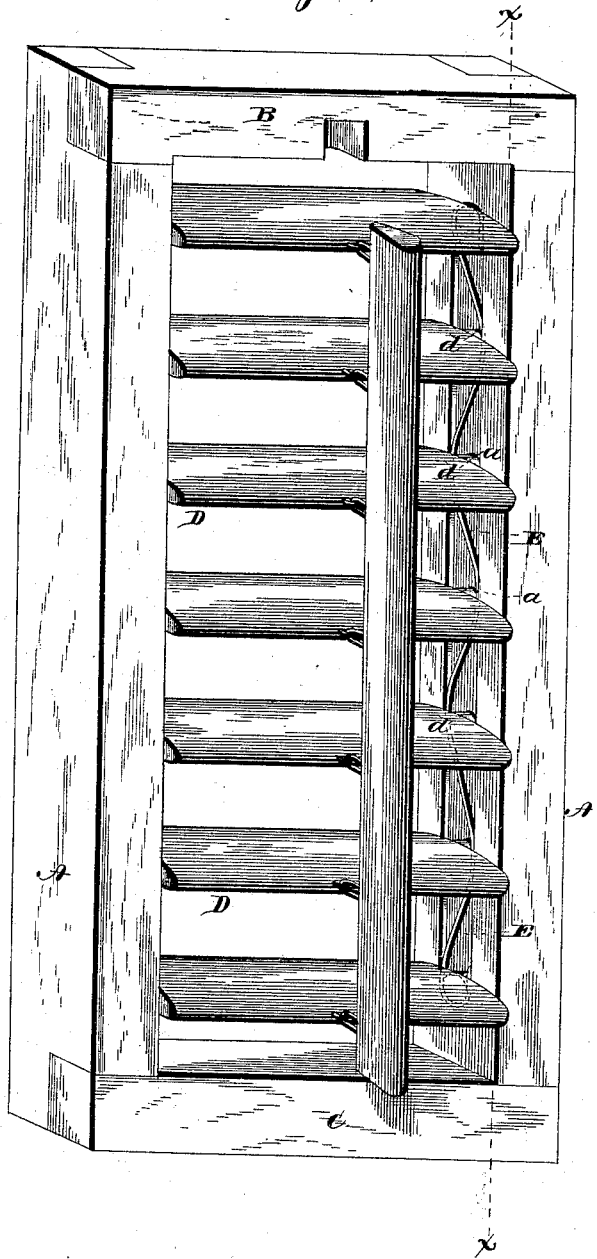
Figure 2:
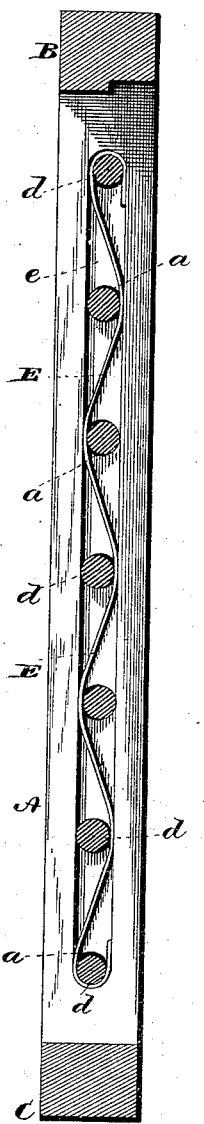

Figure 1 is a perspective view of a window-blind provided with my slat-holders, and Fig. 2 is a section of the same upon line $x\ x$ of Fig. 1.

Letters of like name and kind refer to like parts in each of the figures.

The design of my invention is to prevent the slats of window-blinds from rattling and to hold the same in position when adjusted thereto, to which end said invention consists in combining with the pintles of a row of blind-slats a spring-rod which extends from the bottom to the top of the row and bears alternately upon the front side and upon the rear side of the pintles of said row, substantially as and for the purpose hereinafter shown.

In the annexed drawings, A and A represent the side rails, B the top rail, and C the bottom rail, of a blind-frame that is provided with a row of slats, D, each of which has at each end a pintle, $d$, that is journaled within one of a series of corresponding openings, $a$, which are provided in each of said side rails, all in the usual manner.

Secured at one end within one of the side rails, A, at or near the lower end of the same, is a spring-wire, E, which from thence extends upward to or near the upper end of said rail, and in its passage is carried alternately in front and then in rear of the pintles $d$, and is given such form or tension as to cause it to exert a pressure upon one side of each pintle and hold the same against the opposite side of its pivotal opening $a$. The spring E operates to prevent the slats D from rattling, and also acts as a stop, so that when adjusted to position—either closed, partially open, or wholly open—said slats will maintain such position and not be moved by the wind. The side rail, A, is preferably provided within its inner face with a longitudinal groove, $a'$, for the reception of the spring E; but as blinds are usually constructed there is sufficient end motion of the slats to permit of the insertion of said spring without any special provision for its reception. While said spring is preferably constructed from round wire, it may, if desired, be constructed from flat wire, in which event its breadth of bearing upon the pintles would be increased and less pressure required to hold the slats in place.

Having thus fully set forth the nature and merits of my invention, what I claim is—

In combination with the pintles of a row of blind-slats, a spring-rod which extends from the bottom to the top of the row and bears alternately upon the front side and upon the rear side of the pintles of said row, substantially as and for the purpose shown.

In testimony that I claim the foregoing I have hereunto set my hand this 30th day of March, 1885.

DAVID HINMAN.

Witnesses:
  MARCUS H. HOLCOMB,
  SHERMAN F. GUERNSEY.